United States Patent
Lefort et al.

(10) Patent No.: US 11,181,675 B2
(45) Date of Patent: Nov. 23, 2021

(54) OPTICAL POLARIZER ASSEMBLY

(71) Applicant: Armament Technology Inc., Halifax (CA)

(72) Inventors: David Lefort, Providence, RI (US); Myron Sleeper, Marshfield, MA (US)

(73) Assignee: ARMAMENT TECHNOLOGY INC., Halifax (CA)

( * ) Notice: Subject to any disclaimer, the term of this patent is extended or adjusted under 35 U.S.C. 154(b) by 194 days.

(21) Appl. No.: 16/251,413

(22) Filed: Jan. 18, 2019

(65) Prior Publication Data
US 2020/0233132 A1 Jul. 23, 2020

(51) Int. Cl.
*G02B 5/30* (2006.01)
*G02B 27/28* (2006.01)

(52) U.S. Cl.
CPC ........... *G02B 5/3025* (2013.01); *G02B 27/28* (2013.01)

(58) Field of Classification Search
CPC ....... F41G 11/004; F41G 1/383; G02B 23/14; G02B 23/16; G02B 7/006; G02B 27/28; G02B 5/3025
USPC ..................................................... 359/489.01
See application file for complete search history.

(56) References Cited

U.S. PATENT DOCUMENTS

| | | | | |
|---|---|---|---|---|
| 2,399,658 A * | 5/1946 | Banker | ................ | G02B 26/023 359/489.2 |
| 4,063,266 A * | 12/1977 | Thomas | ............... | G02B 27/281 396/544 |
| 4,392,723 A * | 7/1983 | Gehmann | ............... | G02B 23/14 359/490.02 |
| 5,201,135 A * | 4/1993 | Cowles | .................... | F41G 1/38 359/600 |
| 5,495,676 A * | 3/1996 | Chesnut | .................. | F41G 1/383 359/511 |
| 6,275,337 B1 | 8/2001 | Jones | | |
| 6,416,189 B1 * | 7/2002 | Watson | .................. | G02B 23/16 359/511 |
| 6,799,854 B1 * | 10/2004 | Steiner | .................... | G02B 23/16 359/511 |
| 9,157,586 B1 * | 10/2015 | Babcock, IV | .......... | F21V 11/14 |
| 9,683,812 B2 * | 6/2017 | Hamilton | ............... | G02B 23/16 |
| 9,846,009 B1 * | 12/2017 | McDaniels | .............. | F41G 1/383 |
| 9,945,639 B1 * | 4/2018 | Geraci | ...................... | G02B 7/02 |
| 10,240,897 B2 * | 3/2019 | Hamilton | ................ | F41G 1/383 |
| 2002/0167731 A1 * | 11/2002 | Watson | .................... | F41G 1/383 359/611 |
| 2007/0019304 A1 * | 1/2007 | Nomura | ................. | G03B 17/12 359/700 |
| 2011/0249335 A1 * | 10/2011 | Strawderman | ......... | G02B 23/16 359/511 |

(Continued)

*Primary Examiner* — Collin X Beatty
(74) *Attorney, Agent, or Firm* — Fish & Richardson P.C.

(57) ABSTRACT

Optical polarizers, polarizer assemblies, and associated methods are disclosed herein. The polarizer assemblies may be removably coupled to an optical sight, particularly to an optical sight of a firearm. The polarizer assemblies may include a cover that is movable between a closed configuration in which an optical polarizer is aligned with an optical path of the optical sight and an open configuration in which the optical polarizer is not aligned with the optical path. The cover may be spring loaded such that the cover is biased into the open configuration. The polarizer assemblies may have retaining features to removably retain the polarizer assembly onto the optical sight.

18 Claims, 6 Drawing Sheets

(56) References Cited

U.S. PATENT DOCUMENTS

| | | | |
|---|---|---|---|
| 2013/0230309 A1* | 9/2013 | Porter | G03B 17/48 396/432 |
| 2015/0015977 A1* | 1/2015 | Karasawa | G03B 17/565 359/892 |
| 2015/0226960 A1* | 8/2015 | Cheng | F41G 1/383 359/511 |
| 2015/0268000 A1* | 9/2015 | Carroll | F41G 1/38 42/111 |
| 2019/0219812 A1* | 7/2019 | Havens | G02B 23/16 |

* cited by examiner

OPTICAL POLARIZER ASSEMBLY

TECHNICAL FIELD

The present disclosure is directed to polarizer assemblies that are removably couplable to an optical sight and, particularly, to polarizer assemblies having an optical polarizer that is pivotably movable from a line of sight through the optical sight such that application of optical filtering by the polarizer is selectable by a user.

SUMMARY

An aspect of the present disclosure is directed to a polarizer assembly adapted to be mounted to an optical sight. The polarizer assembly may include a frame adapted to be coupled to an end of an optical sight, a cover pivotably coupled to the frame, and an optical polarizer coupled to the cover and movable therewith. The cover may be rotatable from a first position in which a longitudinal axis of the cover is aligned with a longitudinal axis of the frame to a second position in which the longitudinal axis of the cover is not aligned with the longitudinal axis of the frame.

Another aspect of the present disclosure is directed to a polarizer assembly adapted to be removably coupled to an optical sight. The polarizer assembly may include a frame adapted to couple to an optical sight, a cover pivotably coupled to the frame by a hinge, a first locking ring disposed on a first side of the cover, a second locking ring disposed on a second side of the cover, and a polarizer coupled to the first locking ring. The cover may be sandwiched between the first locking ring and the second locking ring.

Another aspect of the present disclosure is directed to a method for mounting a polarizer assembly to a mounting feature of an optical sight. The method may include providing a polarizer assembly. The polarizer assembly may include a frame, a cover mounted to the frame, and an optical polarizer coupled to the cover. The frame may include a recess defining an inner surface, a plurality of inwardly-extending tabs formed on the inner surface, and an annular slot within the recess defined by the plurality of inwardly-extending tabs. The method may also include engaging the polarizer assembly with the mounting feature of the optical sight such that the plurality of inwardly-extending tabs contact the mounting feature of the optical sight; elastically expanding the plurality of inwardly-extending tabs outwardly to accommodate passage of a mounting feature of the optical sight when advancing the polarizer assembly towards the optical sight; contracting the plurality of inwardly-extending tabs inwardly upon passage of the mounting feature; and capturing the mounting feature within the annular slot to secure the polarizer assembly to the optical sight.

The various aspects may include one or more of the following features. The cover may include an opening, and the optical polarizer may be received into the opening of the cover. A first locking ring may be disposed on a first side of the cover. A second locking ring may be disposed on a second side of the cover opposite the first side. The first locking ring and the second locking ring may cooperate to secure the optical polarizer to the cover. The first locking ring may include a cylindrical portion and an annular shoulder. The cylindrical portion may be received into an opening formed by the cover, and the annular shoulder may abut the first side of the cover. The second locking ring may include an annular slot. The cylindrical portion of the first locking ring may be received into the slot, and the cover may be sandwiched between the first locking ring and the second locking ring. The cylindrical portion may include a first threaded surface. An inner surface of the slot may include a second threaded surface, and the first threaded surface and the second threaded surface may be threadably engaged to secure the first locking ring and the second locking ring to the cover. The second locking ring may include an outer portion, and the outer portion may abut the second side of the cover. The first locking ring may include a first threaded surface formed on an inner surface. The optical polarizer may include a second threaded surface formed on an outer surface, and the first threaded surface may threadably engage the second threaded surface to secure the first locking ring and the optical polarizer together. The frame may include one of an annular ridge or an annular groove. The cover may include the other of the annular ridge or the annular groove, and the annular ridge may be received into the annular groove to define a detent that secures the cover and frame together when the cover is in the first position. A hinge may join the frame and the cover. The hinge may include a slot and a hinge pin. A spring may be received into the slot such that the hinge pin extends through the spring. The frame may include a plurality of tabs formed on an interior surface of a cylindrical recess. The plurality of tabs may be operable to releasably secure the optical polarizer assembly to an optical sight.

The various aspects may also include one or more of the following features. The optical polarizer may be rotatable about an optical axis relative to the cover to adjust an amount of filtration of glare-producing scattered or reflected light. A detent may be operable to selectively secure the cover to the frame. The detent may include an annular ridge formed on one of the frame or the cover and an annular groove formed on the other of the frame or the cover. The annular ridge may be received into the annular groove to secure the cover to the frame. The second locking ring may include an annular slot. The first annular ring may be received into and threadably secured within the annular slot. The frame may include a cylindrical recess defining an inner surface and a plurality of tab formed along the inner surface of the cylindrical recess. The plurality of tabs may be elastically displaceable outwardly to accommodate a mounting feature of an optical sight and retractable inwardly upon passage of the mounting feature of the optical sight beyond the plurality of tabs. Each of the plurality of tabs may include an inclined surface. The inclined surfaces may be adapted to engage the mounting feature of the optical sight. At least one of the plurality of inwardly-extending tabs may include an inclined surface adapted to facilitate coupling of the polarizer assembly onto the optical sight.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
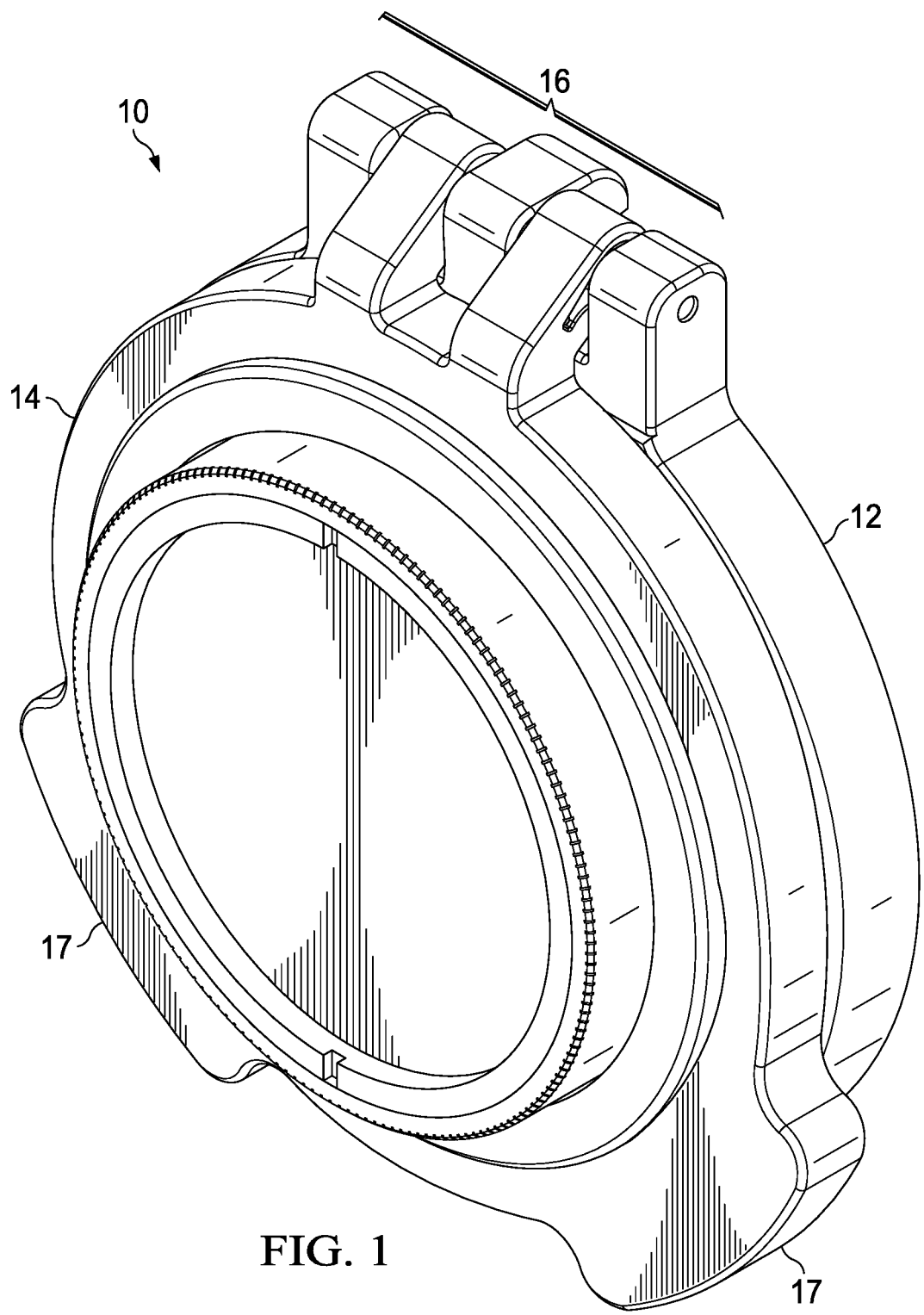
FIG. 1 is a perspective view of an example polarizer assembly.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to polarizer assemblies that are removable couplable to an optical sight or scope. Particularly, the polarizer assemblies may be removable coupled to an optical sight or scope for a firearm, such as a rifle or pistol. Example optical sights include, but are not limited to, telescopic or reflex rifle or pistol scopes. FIG. 1 shows an example polarizer assembly 10 within the scope of the disclosure. The polarizer assembly 10 includes a frame 12 that attaches, directly or indirectly, to an end of an optical sight. In the particular example shown in FIG. 1, the polarizer assembly 10 may be coupled to a proximal end of an optical sight such that the polarizer assembly sits adjacent to an ocular lens or eyepiece. A cover 14 is pivotably mounted to the frame 12 via a hinged 16. The hinge 16 enables the frame 12 and cover 14 to rotate relative to each other. For example, when the polarizer assembly 10 is mounted to an optical sight, a user may swing the cover 14 relative to the frame 12 such than a longitudinal axis of the frame 12 no longer aligns with a longitudinal axis of the cover 14. A user may swing the cover 14 by engaging a tab 17 formed on the cover 14. Although the illustrated example cover 14 includes two tabs 17 a single tab or more than two tabs may be used.

Figure 2:
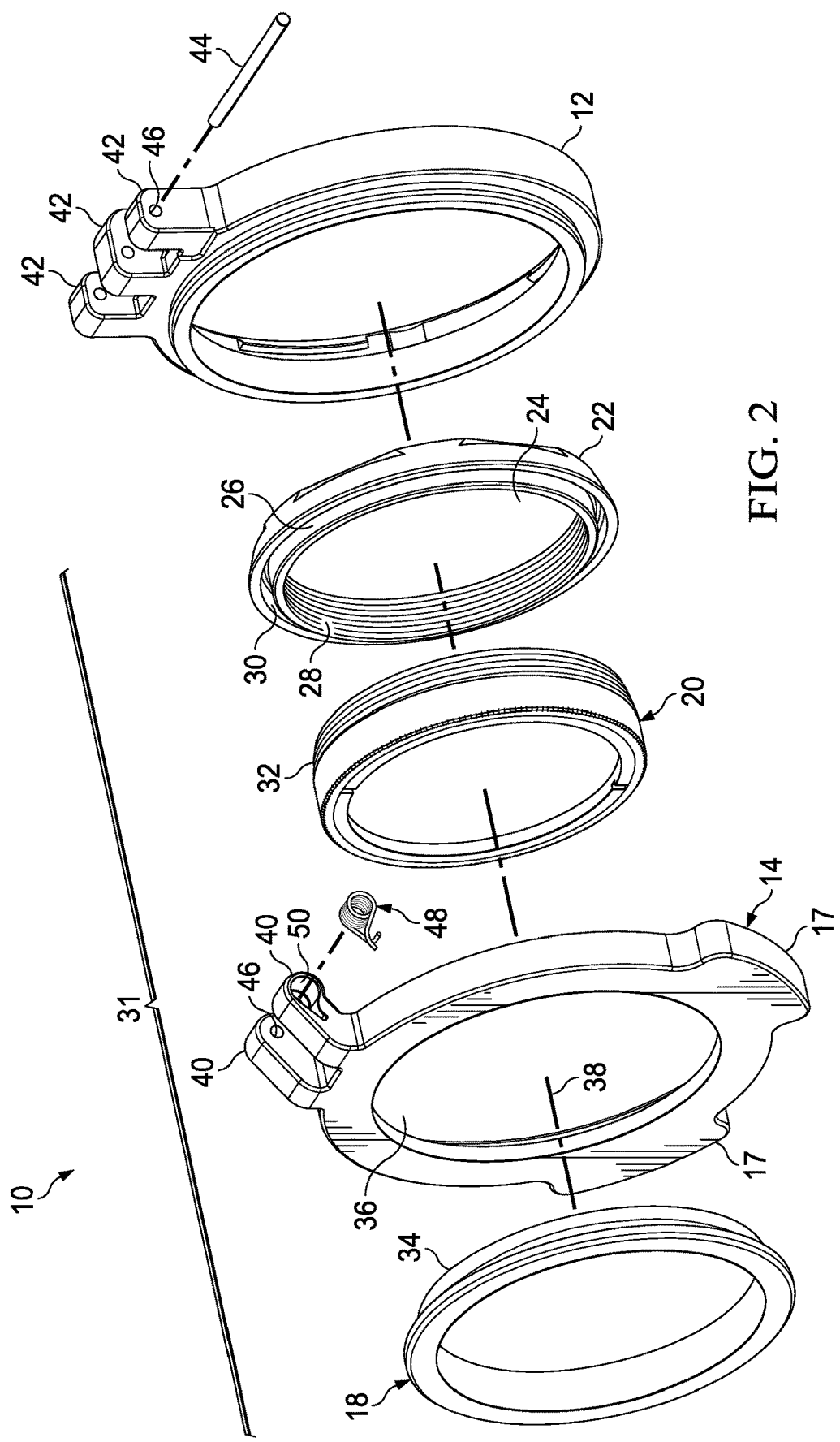
FIG. 2 shows an exploded view of the example polarizer of FIG. 1.

FIG. 2 is an exploded view of the example polarizer assembly 10 shown in FIG. 1. As shown, in addition to the frame 12 and cover 14, the polarizer assembly 10 also includes a first locking ring 18, an optical polarizer 20, and a second locking ring 22. The cover 14 defines an opening 36. The optical polarizer 20 is received into an opening 24 formed in the second locking ring 22. The second locking ring 22 also includes an annular slot 26. A first threaded surface 28 formed on an interior surface of the opening 24, and a second threaded surface 30 is formed on an interior surface 66 of the annular slot 26. The optical polarizer 20 includes an external threaded surface 32, and the first locking ring 18 includes an external threaded surface 34. A longitudinal axis 38 of the polarizer assembly 10 is also shown. In this example, the longitudinal axis 38 is an optical axis of the polarizer assembly 10.

Figure 3:
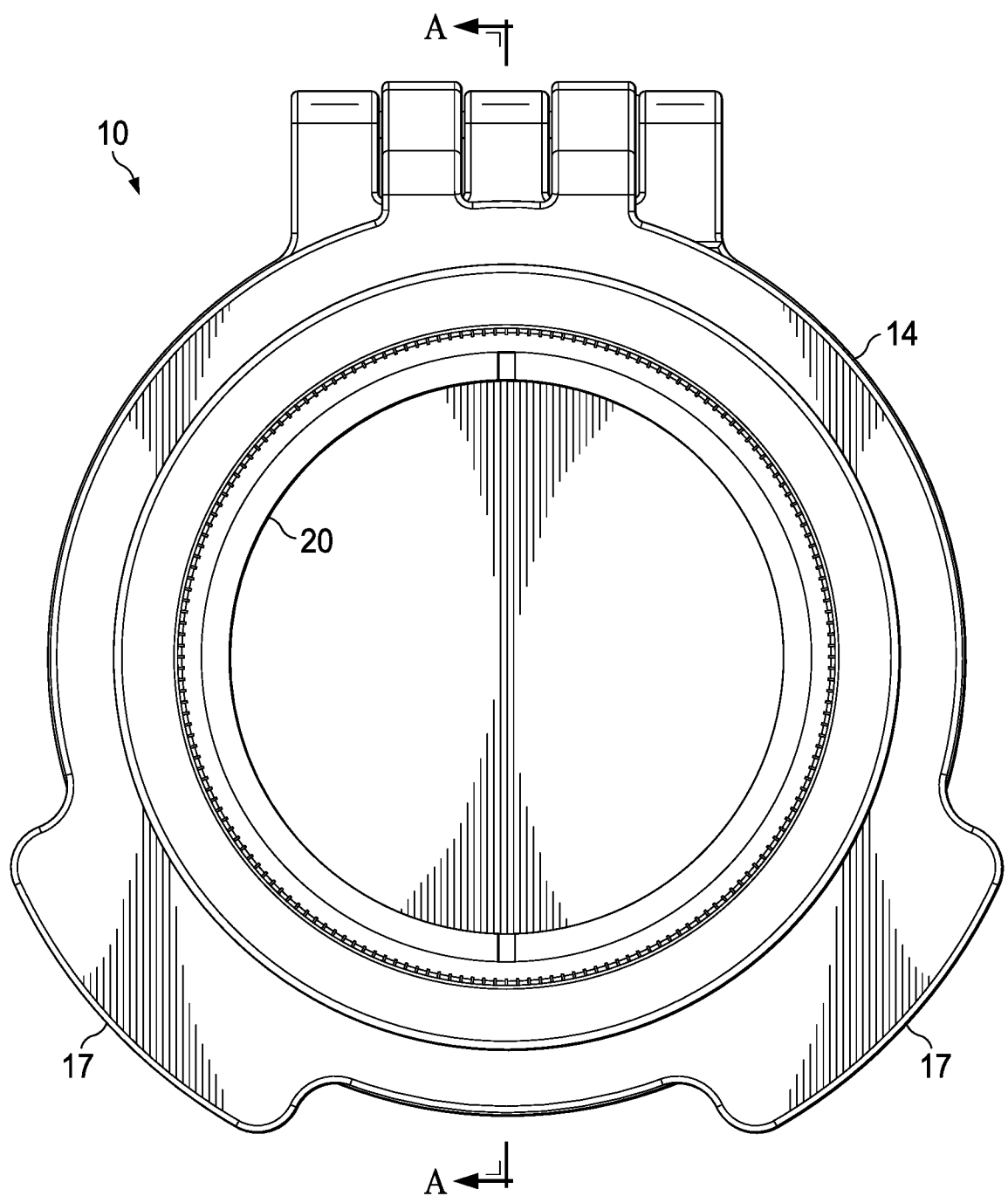
FIG. 3 shows a front view of the example polarizer of FIG. 1.
Figure 5:
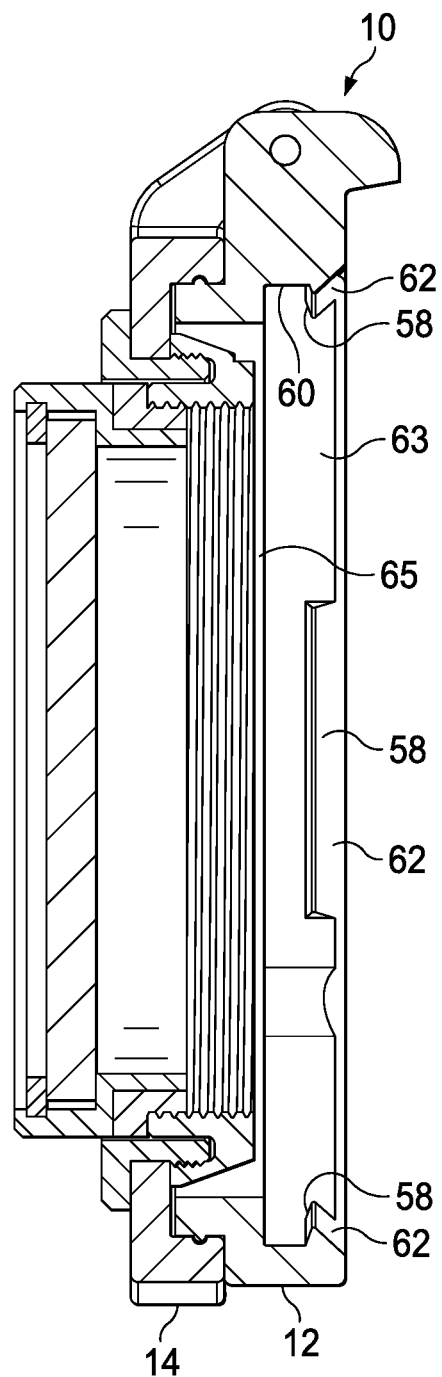
FIG. 5 is a cross-sectional view of the example polarizer of FIG. 3 taken along line AA.
Figure 6:
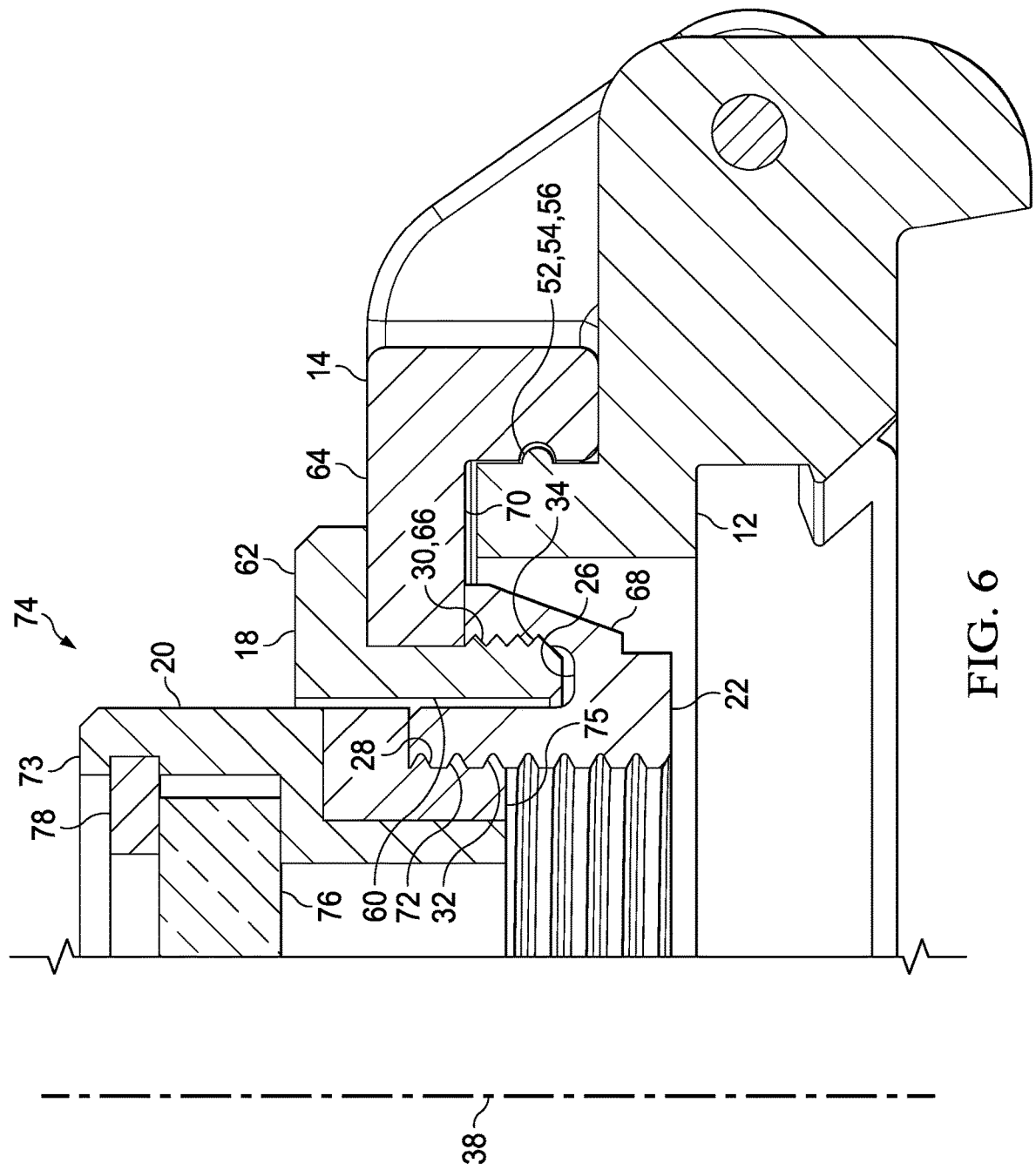
FIG. 6 is a detail view of a portion of the example polarizer shown of FIG. 5.

FIG. 3 shows a front view of the example polarizer assembly 10. FIG. 5 is a cross-sectional view of the example polarizer assembly 10 taken along line AA, and FIG. 6 is a detail view of a portion of the example polarizer assembly 10 shown in FIG. 5. As shown in FIG. 6, the first locking ring 18 includes a cylindrical portion 60 and an annular shoulder 62. When coupled to the cover 14, the cylindrical portion 60 is received into the opening 36, and the annular shoulder 62 abuts a first side 64 of the cover 14. The cylindrical portion 60 is received into the annular slot 26 formed in the second locking ring 22. With the cylindrical portion 60 received into the annular slot 26, the threaded surface 34 formed on the cylindrical portion 60 is engaged with the threaded surface 30 formed on the interior surface 66 of the slot 26 of the second locking ring 22. An outer portion 68 of the second locking ring 22 abuts a second side 70 of the cover 14. When assembled, the first locking ring 18 and the second locking ring 22 clamp the cover 14 therebetween. As shown, the optical polarizer 20 threads into the second locking ring 22, thereby coupling the optical polarizer 20 to the cover 14. When the threaded surfaces 32 and 28 are fully engaged, the optical polarizer 20 abuts an inner portion 72 of the second locking ring 22.

In other implementations, the first locking ring 18 and the optical polarizer 20 may be a single, integrated component. For example, in some instances, the locking ring 18 and a housing of the optical polarizer 20 may be integrally formed. In other instances, the locking ring 18 and the housing of the optical polarizer 20 may be joined, such as by welding, e.g., sonic welding, laser welding, or resistance welding; an adhesive; interference fit; or other joining operation or method operable to join the first locking ring 18 to the optical polarizer 20.

FIGS. 5 and 6 also illustrate an example construction of the optical polarizer 20. As shown in FIGS. 5 and 6, the example optical polarizer 20 includes a housing 74, an optical component 76 disposed within the housing 74, and a retainer 78 that retains the optical component 76 within the housing 74. In some implementations, the retainer 78 may be a circlip. The housing 74 includes a first housing portion 73 and a second housing portion 75. The first housing portion 73 and the second housing portion 75 are rotatable relative to each other about the longitudinal axis 38. The optical component 76 is disposed in the first housing portion 73, and the optical component 76 is rotatable with the first housing portion 73. The optical component 76 is operable to filter light incident thereon. Other construction types of the optical polarizer 20 are contemplated and within the scope of the present disclosure.

As explained above, the external threaded surface 32 of the optical polarizer 20 couples with the first threaded surface 28 of the second locking ring 22 to form a threaded connection that retains the optical polarizer 20 within the opening 24 of the second locking ring 22. The optical polarizer 20 is received into an opening 36 of the cover 14, and the external threaded surface 34 of the first locking ring 18 couples with the second threaded surface 30 of the second locking ring 22, sandwiching the cover 14 between the first locking ring 18 and the second locking ring 22. As a result, the first locking ring 14, the optical polarizer 20, and the second locking ring 22 are coupled to the cover 14, and these components combine to form a subassembly 31. Additionally, with the cover 14, the first locking ring 18, the optical polarizer 20, and the second locking ring 22 assembled together, the optical polarizer 20 or a portion of thereof is capable of rotating relative to the cover 14 about an optical axis, e.g., the longitudinal axis 38, for example, in order to adjust an amount of filtration of the light incident to the optical polarizer 20. As explained above, the first housing portion 73 may be rotated relative to a second housing portion 75 about the longitudinal axis 38. Rotation of the first housing portion 73 in this way also rotates the optical component 76, thereby controlling an amount of light filtration provided by the optical polarizer 20. For example, rotation of the first housing portion 73 (and, hence, the optical component 76) about the optical axis 38 may remove or reduce scattered or reflected light that otherwise produces glare. Referring to FIG. 2, with the optical polarizer 20 installed in the polarizer assembly 10, the first housing portion 73 may be rotated about the longitudinal axis 38 relative to the second housing portion 75, the first locking ring 18, the second locking ring 22, the cover 14, and the frame 12.

Figure 4:
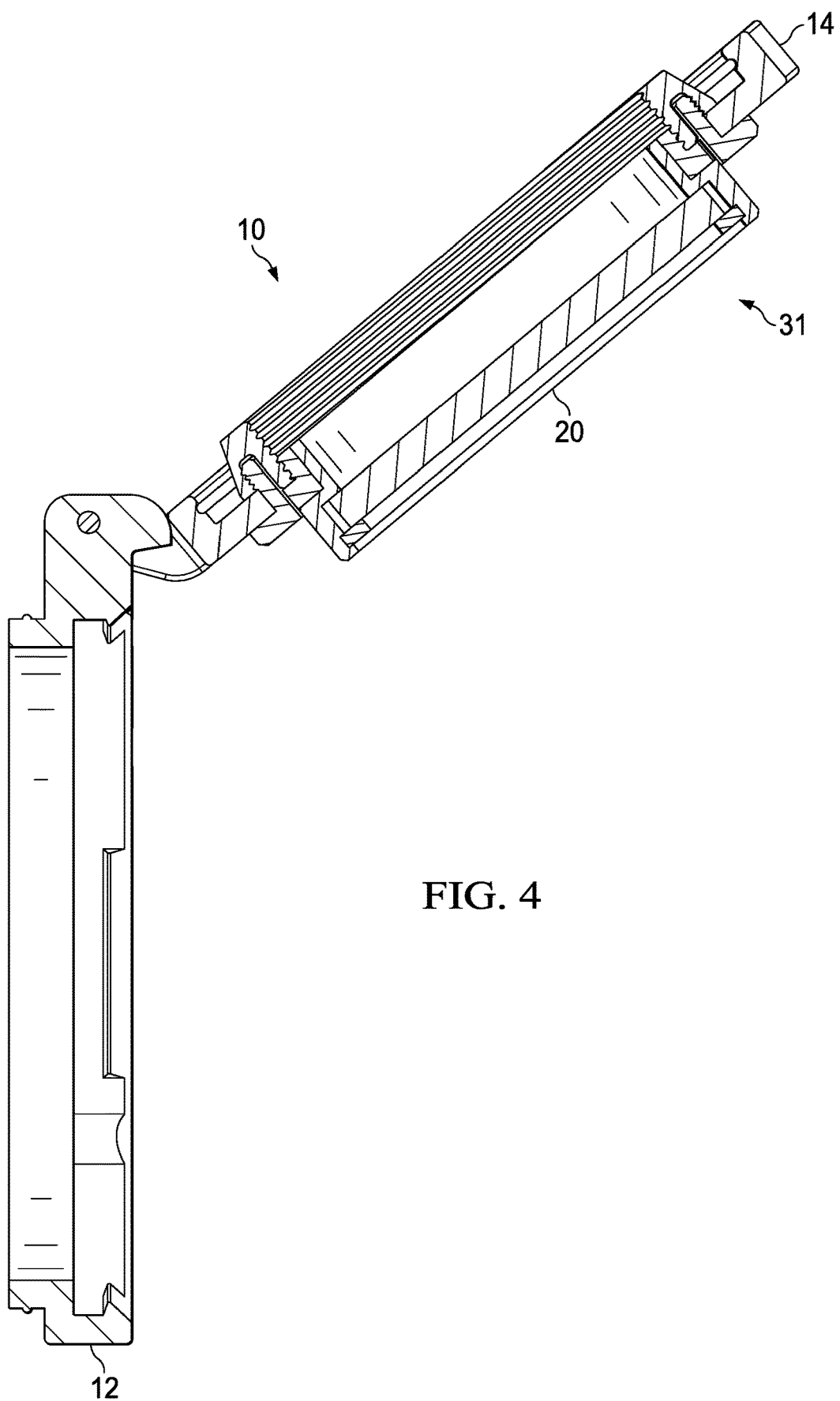
FIG. 4 shows the example polarizer assembly of FIG. 1 in an open configuration.

Referring back to FIGS. 1 and 2, the hinge 16 is formed from a plurality of protrusions 40 formed on the cover 14 that intermesh with a plurality of protrusions 42 formed on the frame 12. A hinge pin 44 extends through openings 46 formed in the plurality of intermeshing protrusions 40 and 42. The subassembly 31 rotates relative to the frame 12 about the hinge pin 44. FIG. 4 shows the polarizer assembly 10 in the open configuration in which the subassembly 31 is rotated relative to the frame 12 about the hinge pin 44. In the open configuration, the subassembly 31 may be referred to as being in a "flipped up" position. In the "flipped up" position, the subassembly 31 remains clear of the frame 12 as well as an eyepiece of an optical sight to which the polarizer assembly 10 may be coupled. In such a configuration, a user may freely approach the optical sight and position the user's face, for example, close to the optical sight without interference from the subassembly 31. Further, as discussed below, a biasing force maintains the polarizer assembly 10 in the open configuration (with the subassembly 31 in the "flipped up" position), thereby preventing the subassembly 10 from returning to the closed position, such as due to a change in orientation of the polarizer assembly 10.

A spring 48 is received into a slot 50 formed in one of the protrusions 40 of the cover 14. In some instances, the spring 48 may be a coil spring. Although a single spring 48 is shown, a second spring may also be used. The second spring may be received into a slot, similar to slot 50, formed in the other protrusion 40 of the cover 14. The hinge pin 44 extends through a central opening of the spring 48, and the spring 48 is retained in the slot 50 by an adjacent protrusion 42 of the frame 12.

FIGS. 5 and 6 show the example polarizer assembly 10 in an unactuated or closed configuration. In the closed configuration, the frame 12, the cover, 14, the first locking ring 18, the optical polarizer 20, and the second locking ring 22 are aligned and share a common longitudinal axis, e.g., longitudinal axis 38 shown in FIG. 2. In an actuated or open configuration, the cover 14, the first locking ring 18, the optical polarizer 20, and the second locking ring 22 are pivoted relative to the frame 12 about the hinge pin 44. In the open configuration, a longitudinal axis of the optical polarizer 20 is not aligned with a longitudinal axis of the frame 12. A user may use one or more of the tabs 17 to swing the subassembly 31 and selectively place the optical assembly 10 in either the open configuration or the closed configuration.

The spring 48 is configured to apply a force that urges the polarizer assembly 10 into the open configuration. Consequently, with the polarizer assembly 10 in the closed configuration, as shown, for example, in FIG. 5, the spring 48 urges the subassembly 31 away from the frame 12. The urging force of the spring 48 is prevented from moving the subassembly 31 into the flipped up position (and, hence, prevents the polarizer assembly 10 from being placed in the open configuration) by a detent 52 formed between the cover 14 and the frame 12. As shown in FIGS. 5 and 6, the detent 52 includes an annular ridge 54 formed on the frame 12 and an annular groove 56 formed in the cover 14. The annular ridge 54 and the annular groove 56 cooperate to counteract the urging force of spring 48 and keep the cover 14 adjacent to the frame 12 each and the polarizer assembly 10 in the closed configuration.

The polarizer assembly 10 may be coupled to an optical sight by a plurality of tabs 58 formed on an inner surface of a cylindrical recess 63 formed in the frame 12. The tabs 58 extend inwardly. The plurality of tabs 58 define an annular slot 60 formed in the cylindrical recess 63 between an end surface 65 of the cylindrical recess 63 and the tabs 58. A mounting feature of an optical sight, such as a rim, may be received within the annular slot 60 and held in place by the plurality of tabs 58. Additionally, each tab 58 may include an inclined surface 62 that assists in coupling the optical sight to the polarizer assembly 10. As the rim of the optical sight is inserted into the cylindrical recess 63, the rim rides along the inclined surfaces 62, causing the frame 12 (including the tabs 58) to expand radially. Once the rim of the optical sight is seated within the annular slot 60, the frame 12 contracts to an initial shape, causing the tabs 58 to retain the mounting feature of the optical sight and, consequently, couple the polarizer assembly 10 to the optical sight.

In some implementations, the tabs 58 may be uniformly distributed about the cylindrical recess 63 of the frame 12. In other implementations, the tabs 58 may be arranged in a non-uniform manner within the cylindrical recess 63.

A size of the polarizer assembly 10, or components thereof, may be selected so that the polarizer assembly 10 is mountable or is otherwise able to conform to optical sights having different geometries or constructions. For example, in some instances, a size of the frame 12 may be altered to correspond to a size, e.g., outer diameter, or an outer shape of an optical sight to which the polarizer assembly 10 is to be coupled. In some instances, a size of the optical polarizer 20 may be selected to correspond to a size of an eyepiece of an optical sight.

A number of embodiments of the disclosure have been described. Nevertheless, it will be understood that various modifications may be made without departing from the spirit and scope of the disclosure. For example, in some instances, the annular ridge 54 may be discontinuous. For example, the annular ridge 54 may be formed of a plurality of annular ridge segments. Accordingly, other embodiments are within the scope of the following claims.

What is claimed is:

1. A polarizer assembly adapted to be mounted to an optical sight, the optical polarizer assembly comprising:
    a frame adapted to be coupled to an end of an optical sight, the frame comprising a plurality of tabs formed on an interior surface of a cylindrical recess, the plurality of tabs operable to releasably secure the optical polarizer assembly to the optical sight;
    a cover pivotably coupled to the frame, the cover rotatable from a first position in which a longitudinal axis of the cover is aligned with a longitudinal axis of the frame to a second position in which the longitudinal axis of the cover is not aligned with the longitudinal axis of the frame; and
    an optical polarizer coupled to the cover and movable therewith.

2. The polarizer assembly of claim 1, wherein the cover comprises an opening, and wherein the optical polarizer is received into the opening of the cover.

3. The polarizer of claim 1, further comprising:
a first locking ring disposed on a first side of the cover; and
a second locking ring disposed on a second side of the cover opposite the first side, wherein the first locking ring and the second locking ring cooperate to secure the optical polarizer to the cover.

4. The polarizer assembly of claim 3, wherein the first locking ring comprises a cylindrical portion and an annular shoulder, wherein the cylindrical portion is received into an opening formed by the cover, and wherein the annular shoulder abuts the first side of the cover.

5. The polarizer assembly of claim 4, wherein the second locking ring comprises an annular slot, wherein the cylindrical portion of the first locking ring is received into the slot, and wherein the cover is sandwiched between the first locking ring and the second locking ring.

6. The polarizer assembly of claim 5, wherein the cylindrical portion comprises a first threaded surface, wherein an inner surface of the slot comprises a second threaded surface, and wherein the first threaded surface is threadably engaged with the second threaded surface to secure the first locking ring and the second locking ring to the cover.

7. The polarizer assembly of claim 5, wherein the second locking ring comprises an outer portion, and wherein the outer portion abuts the second side of the cover.

8. The polarizer assembly of claim 3, wherein the first locking ring comprises a first threaded surface formed on an inner surface, wherein the optical polarizer comprises a second threaded surface formed on an outer surface, and wherein the first threaded surface and the second threaded surface are threadably engaged to secure the first locking ring and the optical polarizer together.

9. The polarizer assembly of claim 1, wherein the frame comprises one of an annular ridge or an annular groove, wherein the cover comprises the other of the annular ridge or the annular groove, and wherein the annular ridge is received into the annular groove to define a detent that secures the cover and frame together when the cover is in the first position.

10. The polarizer of claim 1, further comprising a hinge joining the frame and the cover.

11. The polarizer assembly of claim 10, further comprising a spring, wherein the hinge comprises a slot and a hinge pin, and wherein the spring is received into the slot such that the hinge pin extends through the spring.

12. A polarizer assembly adapted to be removably coupled to an optical sight, the optical polarizer assembly comprising:
a frame adapted to couple to an optical sight, the frame comprising:
a cylindrical recess defining an inner surface; and
a plurality of tabs formed along the inner surface of the cylindrical recess, the plurality of tabs elastically displaceable outwardly to accommodate a mounting feature of an optical sight and retractable inwardly upon passage of the mounting feature of the optical sight beyond the plurality of tabs;
a cover pivotably coupled to the frame by a hinge;
a first locking ring disposed on a first side of the cover;
a second locking ring disposed on a second side of the cover, the cover sandwiched between the first locking ring and the second locking ring; and
a polarizer coupled to the first locking ring.

13. The polarizer assembly of claim 12, wherein the optical polarizer is rotatable about an optical axis relative to the cover to adjust an amount of filtration of glare-producing scattered or reflected light.

14. The polarizer assembly of claim 12, further comprising a detent operable selectively to secure the cover to the frame, the detent comprising:
an annular ridge formed on one of the frame or the cover; and
an annular groove formed on the other of the frame or the cover, wherein the annular ridge is received into the annular groove to secure the cover to the frame.

15. The polarizer assembly of claim 12, wherein the second locking ring comprises an annular slot, wherein the first annular ring is received into and is threadably secured within the annular slot.

16. The polarizer assembly of claim 12, wherein each of the plurality of tabs comprises an inclined surface, the inclined surfaces adapted to engage the mounting feature of the optical sight.

17. A method for mounting a polarizer assembly to a mounting feature of an optical sight, the method comprises:
providing a polarizer assembly comprising:
a frame comprising:
a recess defining an inner surface;
a plurality of inwardly-extending tabs formed on the inner surface; and
an annular slot within the recess defined by the plurality of inwardly-extending tabs and an end surface of the recess;
a cover pivotably mounted to the frame; and
an optical polarizer coupled to the cover;
engaging the polarizer assembly with the mounting feature of the optical sight such that the plurality of inwardly-extending tabs contacts the mounting feature of the optical sight;
elastically expanding the plurality of inwardly-extending tabs outwardly to accommodate passage of a mounting feature of the optical sight when advancing the polarizer assembly towards the optical sight;
contracting the plurality of inwardly-extending tabs inwardly upon passage of the mounting feature beyond the plurality of tabs; and
capturing the mounting feature within the annular slot to secure the polarizer assembly to the optical sight.

18. The method of claim 17, wherein at least one of the plurality of inwardly-extending tabs comprises an inclined surface adapted to facilitate coupling of the polarizer assembly onto the optical sight.

\* \* \* \* \*